(12) United States Patent
Jantz et al.

(10) Patent No.: US 7,568,069 B2
(45) Date of Patent: Jul. 28, 2009

(54) METHOD FOR CREATING A LARGE-SCALE STORAGE ARRAY SYSTEM OUT OF MULTIPLE MID-RANGE STORAGE ARRAYS

(75) Inventors: Ray Jantz, Wichita, KS (US); Juan Gatica, Cedar Park, TX (US); Scott Kirvan, Austin, TX (US); Gary Steffens, Tucson, AZ (US)

(73) Assignee: LSI Corporation, Milpitas, CA (US)

( * ) Notice: Subject to any disclaimer, the term of this patent is extended or adjusted under 35 U.S.C. 154(b) by 225 days.

(21) Appl. No.: 11/192,636

(22) Filed: Jul. 29, 2005

(65) Prior Publication Data

US 2007/0028043 A1 Feb. 1, 2007

(51) Int. Cl.
*G06F 12/00* (2006.01)
*G06F 13/00* (2006.01)
*G06F 13/28* (2006.01)

(52) U.S. Cl. ..................................... 711/114
(58) Field of Classification Search ................. 711/114
See application file for complete search history.

(56) References Cited

U.S. PATENT DOCUMENTS

| | | | | |
|---|---|---|---|---|
| 5,600,769 A | * | 2/1997 | Dao et al. | 345/443 |
| 5,884,249 A | * | 3/1999 | Namba et al. | 704/9 |
| 6,223,323 B1 | * | 4/2001 | Wescott | 714/770 |
| 6,834,326 B1 | * | 12/2004 | Wang et al. | 711/114 |

* cited by examiner

*Primary Examiner*—Pierre-Michel Bataille
*Assistant Examiner*—Ralph A Verderamo, III
(74) *Attorney, Agent, or Firm*—William W. Cochran; Christopher P. Whitham; Cochran Freund & Young LLC

(57) ABSTRACT

Disclosed is a method for creating a large-scale storage array by combining multiple mid-range storage arrays via a host based aggregation engine software application. Each mid-range storage array, also call a storage building block, consists of one or more RAID volumes. Each mid-range storage array has equivalent configuration and property settings including number of drives, RAID level, volume segment sizes, and volume cache settings, but not including the volume label. The complex combination of mid-range storage arrays appears as a single storage system to a data management application of a host computer system. Once the mid-range storage arrays are aggregated into a large-scale storage array, or storage complex array, common features may be modified as a collection of items so that a common modification need only be entered one time for all items in the collection. The storage complex array also permits a management application to interact with the storage complex array as a virtual volume without the need to handle the complexities of the individual mid-range storage arrays. A separate graphical user interface application permits a system administrator to configure the aggregation engine without putting the burden of graphics and user interaction into the operation of the aggregation engine. The host based aggregation engine provides cost savings by creating a high end storage system without the need for costly specialized hardware. The aggregation engine is also scalable, permitting the addition or subtraction of mid-range storage arrays.

20 Claims, 8 Drawing Sheets

| LUN CLUSTER NUMBER | LUN NUMBERS IN THE CLUSTER |
|---|---|
| 0 | 1ST SBB: 0, 1, 2, 3, 4, 5, 6, 7<br>2ND SBB: 0, 1, 2, 3, 4, 5, 6, 7 |
| 1 | 1ST SBB: 8, 9, 10, 11, 12, 13, 14, 15<br>2ND SBB: 8, 9, 10, 11, 12, 13, 14, 15 |
| 2 | 1ST SBB: 16, 17, 18, 19, 20, 21, 22, 23<br>2ND SBB: 16, 17, 18, 19, 20, 21, 22, 23 |
| ETC. | |

700 TABLE OF RELATIONSHIP BETWEEN LUN CLUSTER NUMBERS & LUN NUMBERS

FIGURE 7

METHOD FOR CREATING A LARGE-SCALE STORAGE ARRAY SYSTEM OUT OF MULTIPLE MID-RANGE STORAGE ARRAYS

BACKGROUND OF THE INVENTION a. Field of the Invention

The present invention generally pertains to storage systems and more particularly to a combination of Redundant Array of Independent Disks (RAID) data storage volumes.

b. Description of the Background

RAID storage is common high end data storage for corporate and personal computing. RAID storage permits various strategies to optimize a storage system for redundancy and/or speed, as well as minimizing trade offs between redundancy and speed. To further expand the abilities of RAID storage, a Storage Building Block (SBB) may be created as a combination of individual conventional RAID storage volumes. By combining the individual RAID volumes into a larger system, a SBB storage system may be created that is larger than individual RAID storage volumes alone.

RAID storage and SBB systems utilize many technical specifications to create standard products that are capable of interoperating with other devices. Communication standards are one of the primary areas of standardization for RAID storage and SBB storage systems. Common communication standards used for RAID storage and SBB systems include: Fibre Channel, Small Computer System Interface (SCSI), Serial Attached SCSI (SAS), Serial Advanced Technology Attachment (SATA), and others. The Fibre Channel, SCSI, SAS, SATA, and many other technical specifications are kept by the American National Standards Institute (ANSI). ANSI is located at 11 West 42nd Street, 13th Floor, New York, N.Y. 10036, telephone number 212-642-4900, and web site www.ansi.org.

SUMMARY OF THE INVENTION

An embodiment of the present invention may therefore comprise a method for creating a large-scale storage array comprising the steps of: combining multiple storage building blocks into a storage complex, the storage building blocks being a sub-group made up of at least one RAID storage volume, the RAID storage volume being a RAID storage volume made up of at least one physical hard drive, each of the storage building blocks having equivalent configuration and property settings such as number of drives, RAID level, volume segment sizes, and volume cache settings, but not including a volume label; physically connecting the storage complex to a host computer system; and managing the storage complex using aggregation engine software running on the host computer system such that the storage complex appears as a single storage system to a management application on the host computer system.

An embodiment of the present invention may further comprise a large-scale storage array system comprising: a storage complex, the storage complex being a combination of multiple storage building blocks, the combination of multiple storage building blocks being a sub-group made up of at least one RAID storage volume, the RAID storage volume being a RAID storage volume made up of at least one drive, the combination of multiple storage building blocks and the RAID storage volume being physically connected to a host computer system, each of the combination of multiple storage building blocks having equivalent configuration and property settings such as number of drives, RAID level, volume segment sizes, and volume cache settings, but not including a volume label; and an aggregation engine software application that manages the storage complex such that the storage complex appears as a single storage system to a management application on the host computer system.

An embodiment of the present invention may further comprise a large-scale storage array system comprising: means for combining multiple storage building blocks into a storage complex; means for physically connecting the storage complex to a host computer system; and means for managing the storage complex array using aggregation engine software running on the host computer system.

BRIEF DESCRIPTION OF THE DRAWINGS

In the drawings,

FIG. 7 is a table of the relationship between LUN cluster numbers and LUN numbers.

DETAILED DESCRIPTION OF THE INVENTION

Figure 1:
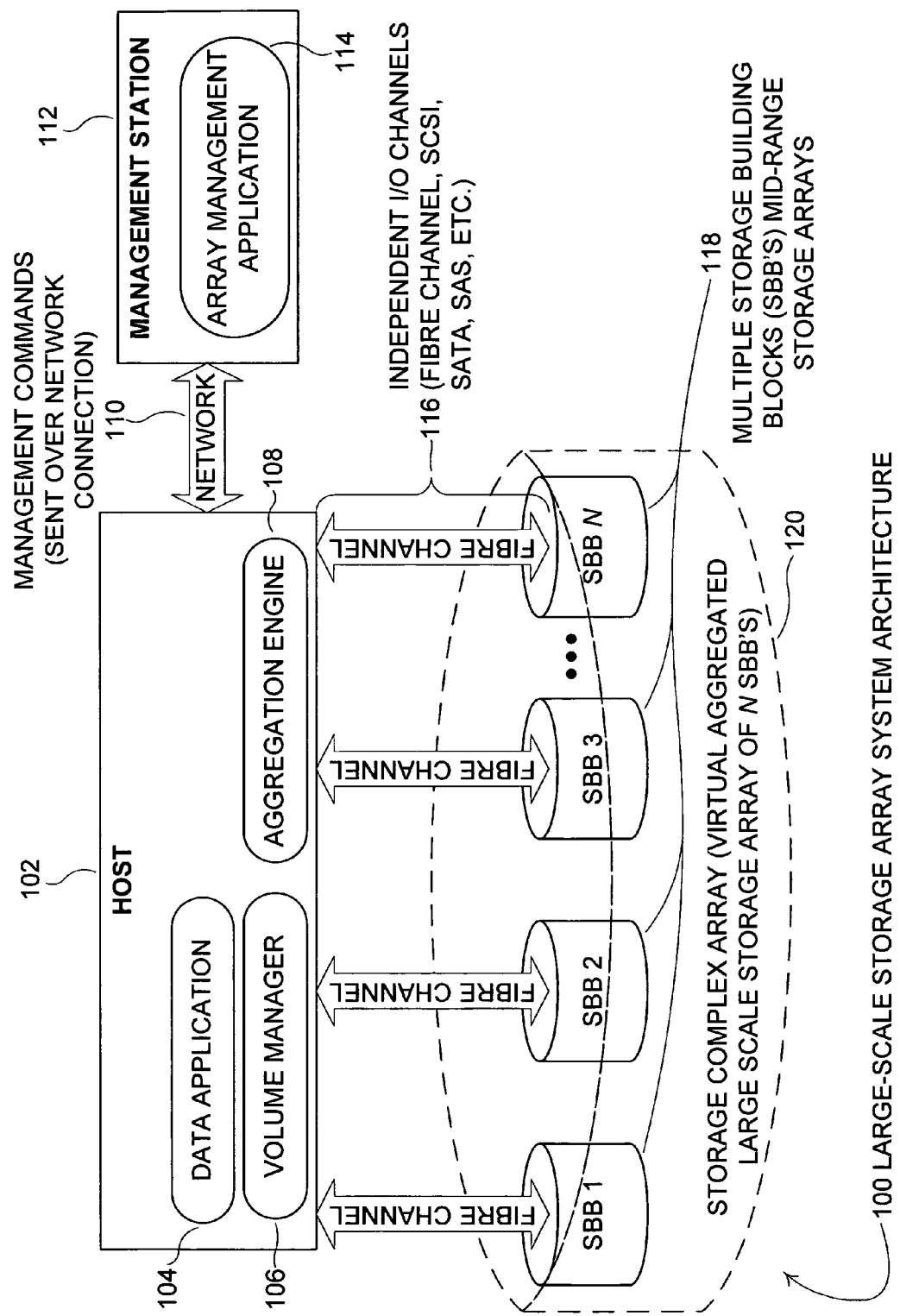
FIG. 1 is a schematic illustration of the system architecture for a large-scale storage array.

FIG. 1 is a schematic illustration of the system architecture 100 for a large-scale storage array 120. The large-scale storage array 120, or storage complex array 120, is a combination of multiple mid-range arrays 118. A mid-range storage array 118, or Storage Building Block (SBB) 118, is made up of one or more conventional RAID storage volumes. The SBB 118 is an aggregation of conventional RAID storage volumes, and the storage complex array 120 is an aggregation of SBB's 118. Hence, the storage complex array 120 is an aggregation 120 of aggregations 118 of conventional RAID storage volumes. The aggregation of aggregations permits a large-scale storage system that appears to the host 102 data application 104 as a single virtual storage volume 120 for ease of use in data storage and system management.

The host computer system 102 runs the data application 104 that views the storage complex array 120 as a single virtual storage system. The aggregation engine 108 and the volume manager 106 running on the host 102 provide the ability for the system to interact with the storage complex array 120 as a single storage system. The volume manager 106 is a standard software application that interacts with the operating system of the host 102 to control the communication path aggregation for the storage complex 120. The volume manager is a software application that may be provided by a number of volume manager software providers such as Veritas Software. Veritas Software is located at 350 Ellis Street, Mountain View, Calif. 94043, telephone number 650-527-8000, and web site www.veritas.com.

The SBB's 118 communicate with the host computer system 102 using standard storage system communication protocol I/O channels 116. The standard communication protocols include, but are not limited to: Fibre Channel, Small Computer System Interface (SCSI), Serial Attached SCSI (SAS), and Serial Advanced Technology Attachment (SATA). All SBB's 118 in a storage complex array 120 must have equivalent configuration and property settings including number of drives, RAID level, volume segment sizes, and volume cache settings, but not including the volume label.

While the volume manager 102 handles the communication path aggregation, the aggregation engine provides the management and control of the storage complex array 120. The aggregation engine 108 is the application which combines the SBB's 118 into a virtual storage complex array 120 for interaction with the array management application 114. The aggregation engine 108 is a multi-tasking application capable of managing multiple instances of storage complex arrays 120. The aggregation engine 108 is also capable of communicating to the multiple storage complex arrays 120 in a parallel fashion. That is, if multiple storage complex arrays 120 require the same communication message, the aggregation engine is capable of sending the communication message to multiple storage complex arrays 120 simultaneously.

The number n of SBB's 118 in a storage complex array 120 is a configurable parameter of the aggregation engine 108. Since the number of SBB's 118 is configurable, the storage complex array 120 is scalable because one may add or subtract SBB's 118 to the storage complex array 120. Configuration of the storage complex array 120 is performed via a software array management application 114 and does not require new hardware. The array management application 114 is a separate software application from the aggregation engine 108. The aggregation engine 108 may be written in the Java programming language and does not include any graphical interface features. The array management software 114 provides the graphical user interface to configure and manage the aggregation engine 108. The array management application 114 may be run on the host computer system 102, but to avoid the security and system inefficiency problems associated with graphical user interfaces, the array management application 114 is typically run on a separate management station computer 112. The management station 112 communicates with the host computer 110 over a standard computer network connection 110. The array management application 114 sends all management commands 110 over the network 110 to the aggregation engine 108 running on the host computer system 102.

Figure 2:
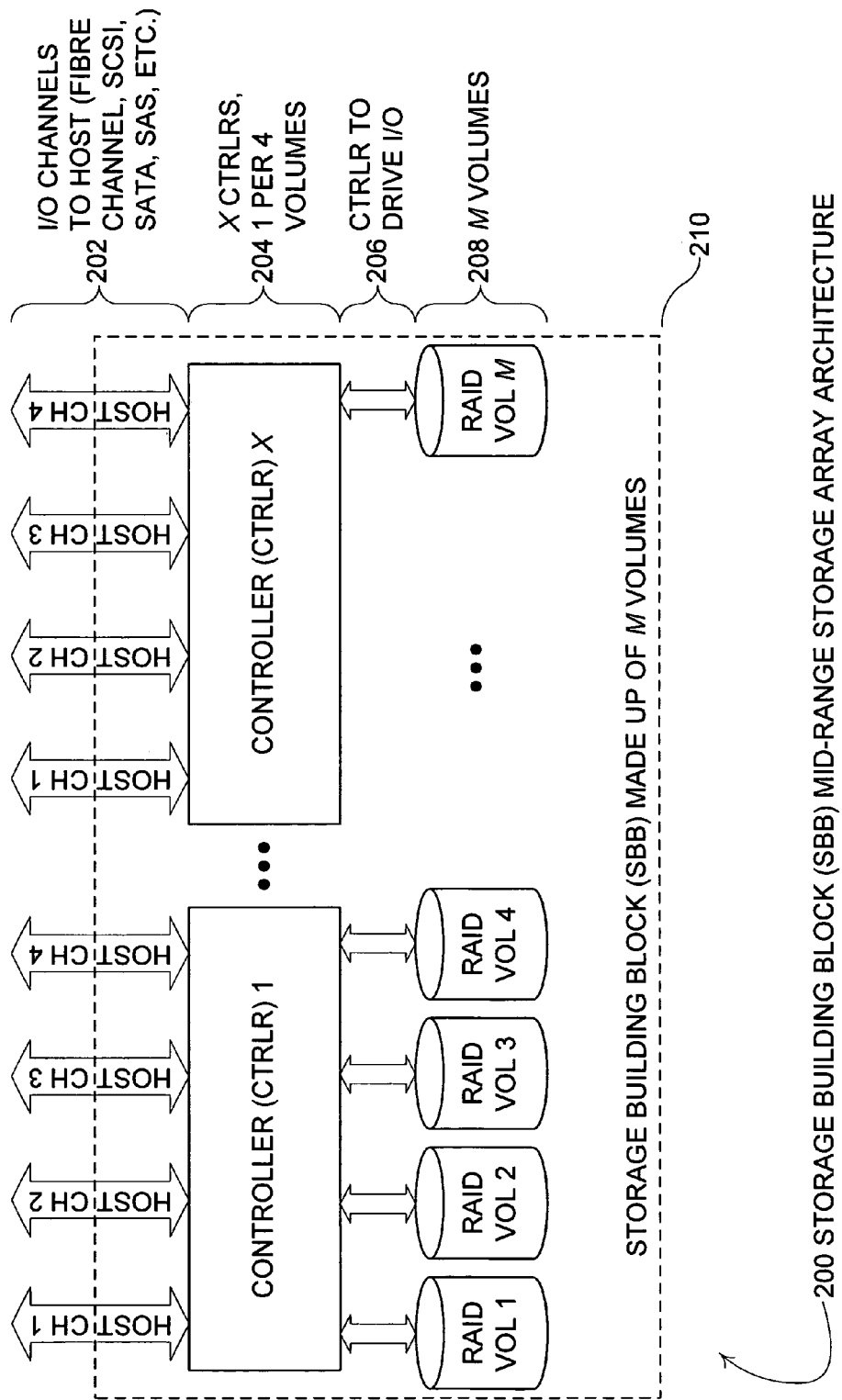
FIG. 2 is a schematic illustration of the architecture of a Storage Building Block (SBB) mid-range storage array.

FIG. 2 is a schematic illustration of the architecture 200 of a Storage Building Block (SBB) mid-range storage array 210. Each SBB 210 consists of one or more RAID volumes 208. The drives comprising the RAID volumes 208 communicate with the controller hardware 206 over controller to drive I/O communication channels 206 as specified by the controller manufacturer. The number x of controllers 204, in combination with the number of I/O channels per controller 202, determines the number m of RAID volumes 208 per SBB 210. In FIG. 2 each controller 204 supports 4 RAID volumes 208 per each controller 204. The controllers 204 communicate with the host computer system using standard storage communication I/O channels 202 including, but not limited to: Fibre Channel, SCSI, SAS, and SATA.

Figure 3:
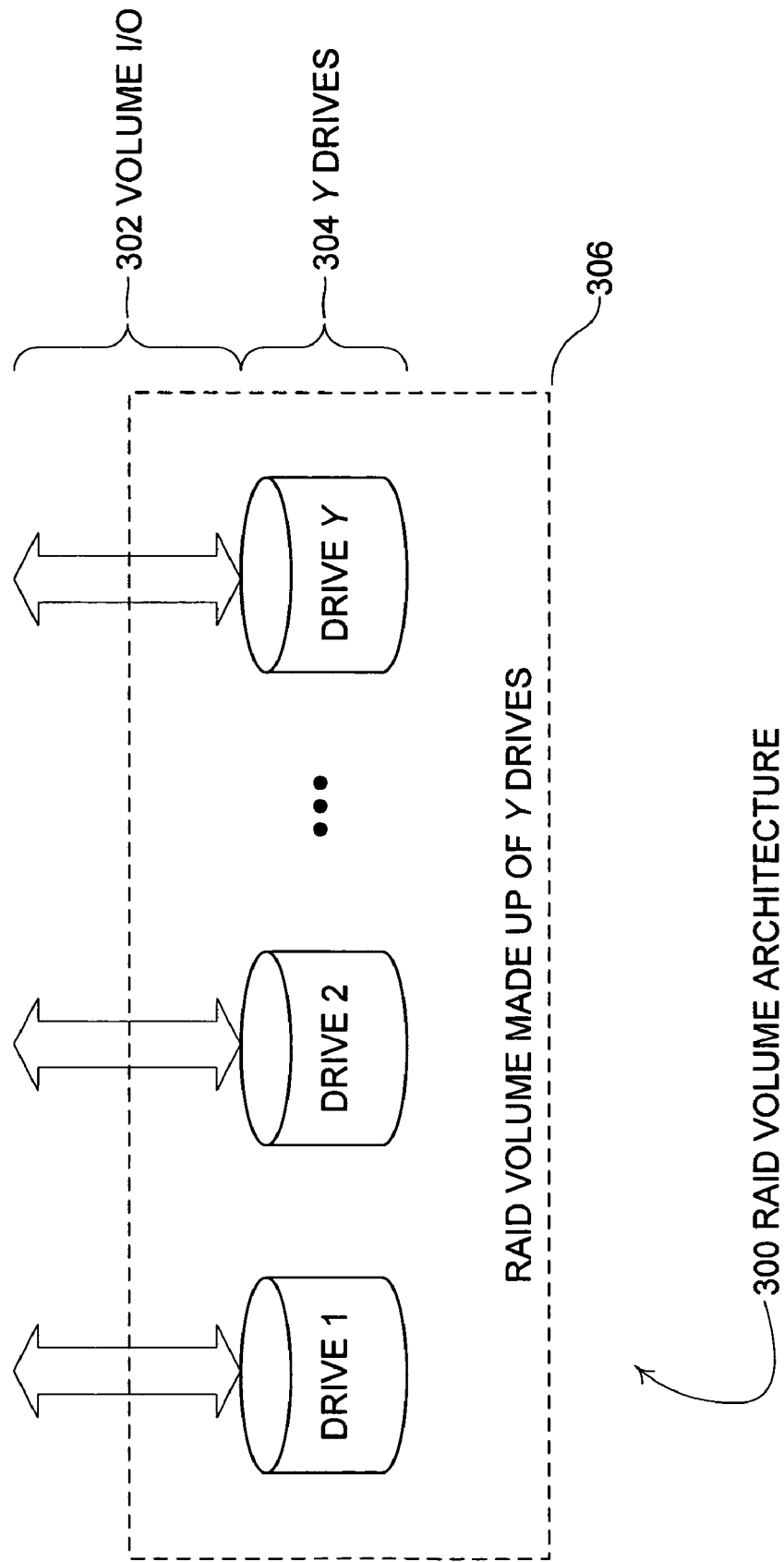
FIG. 3 is a schematic illustration of the architecture of a Redundant Array of Independent Disks (RAID) data storage volume.

FIG. 3 is a schematic illustration of the architecture 300 of a Redundant Array of Independent Disks (RAID) data storage volume 306. A RAID volume 306 consists of multiple data storage drives 304 connected in one of many RAID configurations. The RAID configuration is not important to the storage complex array. The number y of RAID data drives determines how many drive clusters comprise a storage complex array volume. A storage complex array volume is an aggregation of RAID volumes that may consist of RAID volumes belonging to one or more SBB's. The drives comprising the RAID volumes 304 communicate 302 with the SBB controllers over controller to drive I/O channels 302 defined by the RAID system 306 manufacturers.

Figure 4:
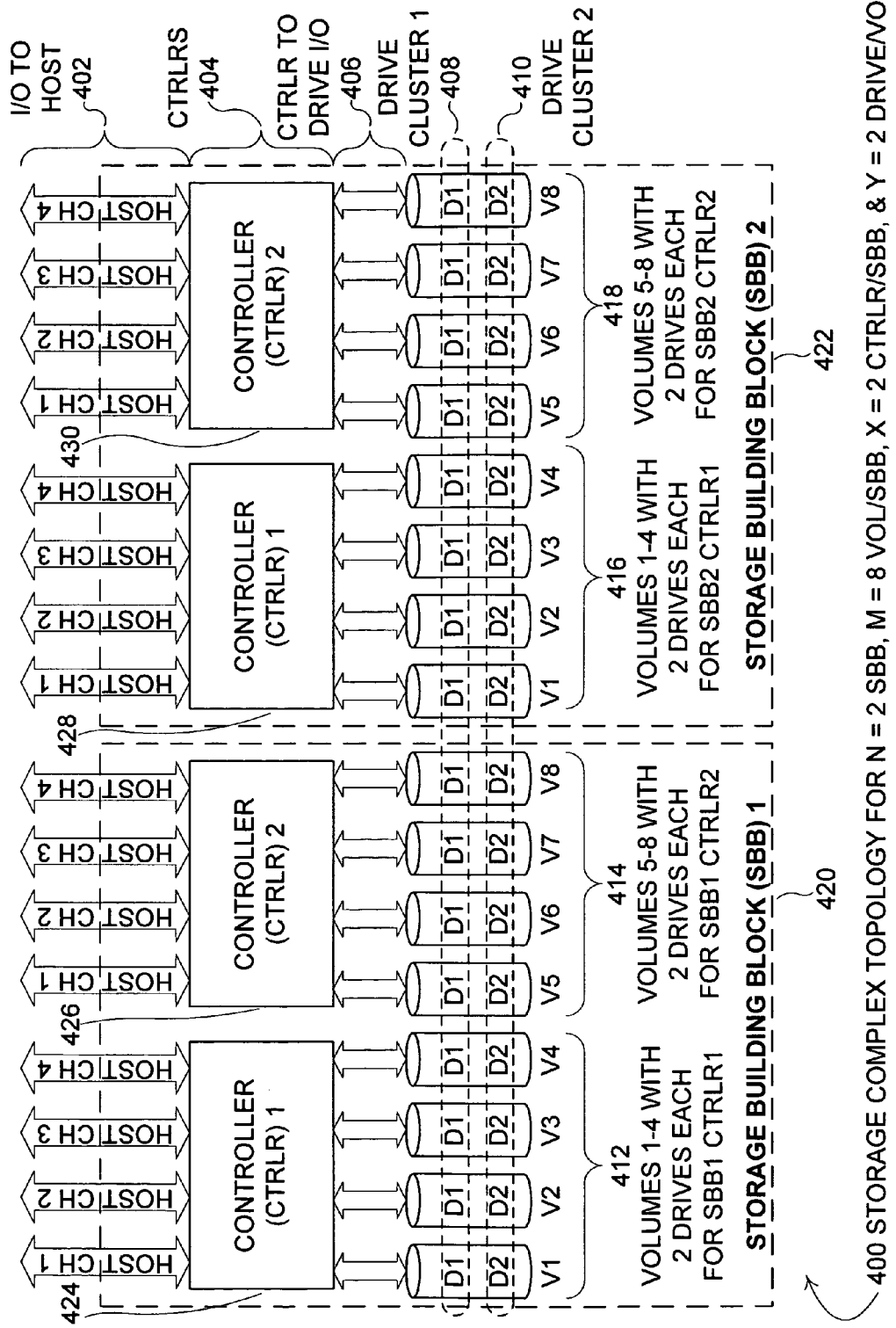
FIG. 4 is a schematic illustration of the topology for a storage complex array with two storage building blocks (SBB's), eight volumes per SBB, two controllers per SBB, and two drives per volume.

FIG. 4 is a schematic illustration of the topology 400 for a storage complex array with two storage building blocks (SBB's) 420, 422, eight volumes 412, 414, 416, 418 per SBB 420, 422, two controllers 404 per SBB 420, 422, and two drives 408, 410 per SBB RAID volume 412, 414, 416, 418. An embodiment may utilize the SYMbol Application Programming Interface (API) when creating the aggregation engine and the array management applications. The SYMbol API is a development tool created by Engenio Information Technologies, Inc. for assisting programmers to communicate with and manage RAID storage volumes and SBB's 420, 422. For information on the SYMbol API contact Engenio Information Technologies, Inc., located at 670 N. McCarthy Boulevard, Milpitas, Calif. 95035, telephone number 408-935-6300, and web site www.engenio.com. The Storage Management Initiative Specification (SMI-S) is another programming tool that may be used as an alternative to, or in addition to, the SYMbol API. For information on the Storage Management Initiative Specification (SMI-S) contact the Storage Networking Industry Association (SNIA), located at 500 Sansome Street, Suite #504, San Francisco, Calif. 94111, telephone number 415-402-0006, and website www.snia.org. Any programming tool intended to assist developers in creating storage system applications may be utilized to create an embodiment of the invention.

In the system 400 shown in FIG. 4, the SYMbol API permits addressing a number of different attributes including volumes 412, 414, 416, 418, SBB's 420, 422, controllers 404, and drive clusters 408, 410. Each SBB 420, 422 is made up of eight RAID volumes 412, 414, 416, 418. The RAID volumes each contain two data drives 408, 410. Each SBB 420, 422 has equivalent configuration and property settings including number of drives, RAID level, volume segment sizes, and volume cache settings, but not including the volume label.

SBB 1 (420) contains eight RAID volumes 412, 414. The first four RAID volumes 412 are connected to controller 1 (424) of SBB 1 (420). The second four RAID volumes 414 of SBB 1 (420) are connected to controller 2 (426) of SBB 1 (420). The connection 406 from the drives comprising the RAID volumes 412, 414 to the controllers 404 is implemented using communication channels 406 specified by the RAID volume 412, 414 and controller 404 manufacturers. The controllers 404 provide I/O channels 402 to the host computer system using standard storage system communication protocols including, but not limited to: Fibre Channel, SCSI, SAS, and SATA.

SBB 2 (422) contains eight RAID volumes 416, 418. The first four RAID volumes 416 are connected to controller 1 (428) of SBB 2 (422). The second four RAID volumes 418 of SBB 2 (422) are connected to controller 2 (430) of SBB 2 (422). The connection 406 from the RAID volumes 416, 418 to the controllers 404 is implemented using communication channels 406 specified by the RAID volume 416, 418 and controller 404 manufacturers. The controllers 404 provide I/O channels 402 to the host computer system using standard storage system communication protocols including, but not limited to: Fibre Channel, SCSI, SAS, and SATA.

A unique concept for the SYMbol API is the drive cluster 408, 410. A drive cluster 408, 410 is an addressing mechanism that permits a developer to address drive 1's (408) for every SBB RAID volume 412, 414, 416, 418 in the entire storage complex volume 400. In FIG. 2 the RAID volumes 412, 414, 416, 418 consist of two drives 408, 410. Drive 1's (408) are addressed via drive cluster 1 (408) and Drive 2's (410) are addressed via drive cluster 2 (410).

The number of volumes 412, 414, 416, 418 per SBB 420, 422, the number of drives 408, 410 per volume 412, 414, 416, 418, and the number of SBB's 420, 422 per storage complex array 400 are all configurable values and are not limited to the values shown in FIG. 2.

Figure 5:
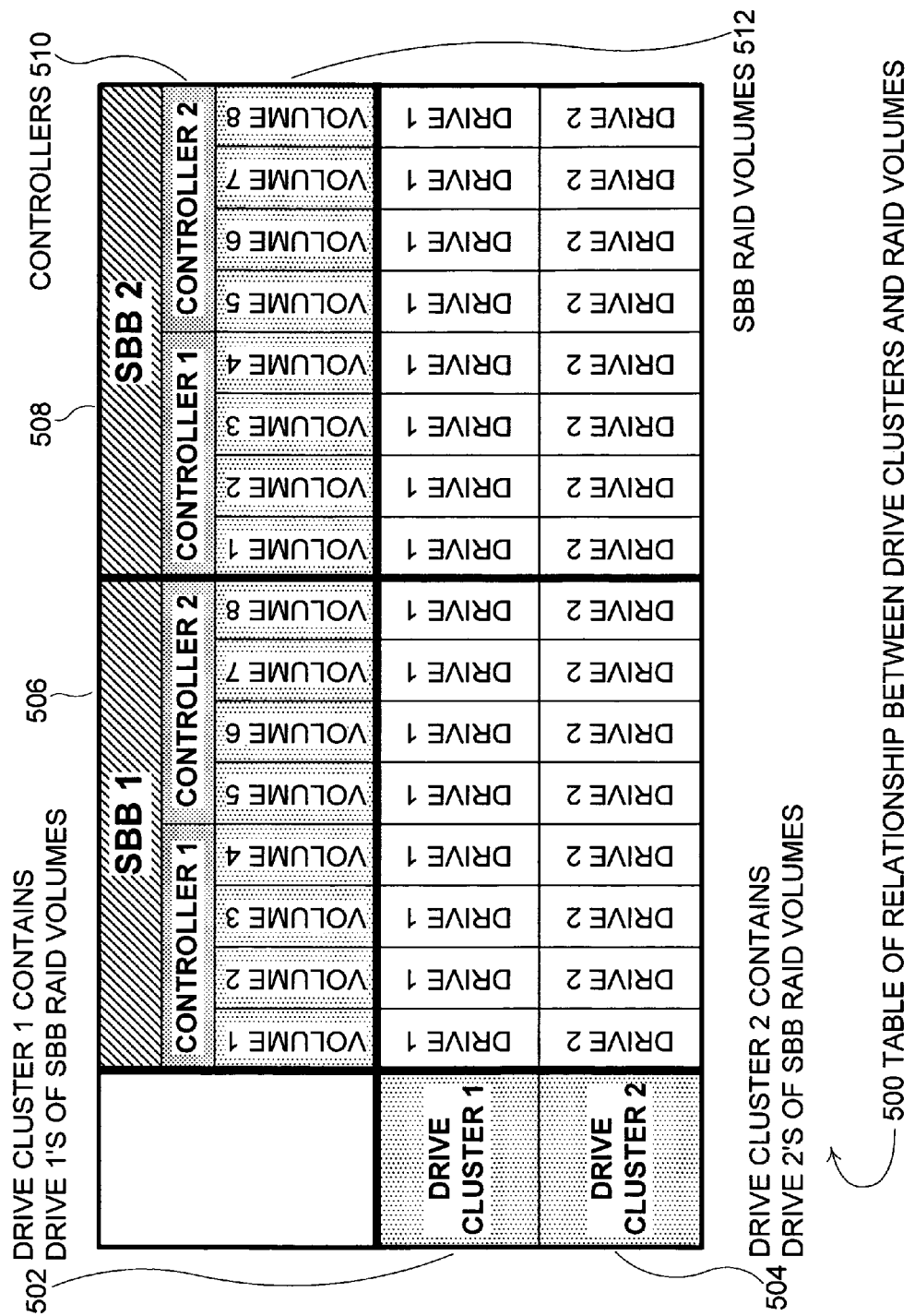
FIG. 5 is a table of the relationship between drive clusters and SBB volumes.

FIG. 5 is a table 500 of the relationship between drive clusters 502, 504 and SBB RAID volumes 512. The table 500 is a reflection of the system described with respect to FIG. 4. Each SBB 506, 508 has two controllers 510 and eight SBB RAID volumes 512. Each SBB RAID volume 512 has two data storage drives 502, 504. Drive cluster 1 (502) addresses the drive 1's (502) for the SBB RAID volumes 512 of both SBB 1 (506) and SBB 2 (508). Drive cluster 2 (504) addresses the drive 2's for the SBB RAID volumes 512 of both SBB1 (506) and SBB 2 (508).

Figure 6:
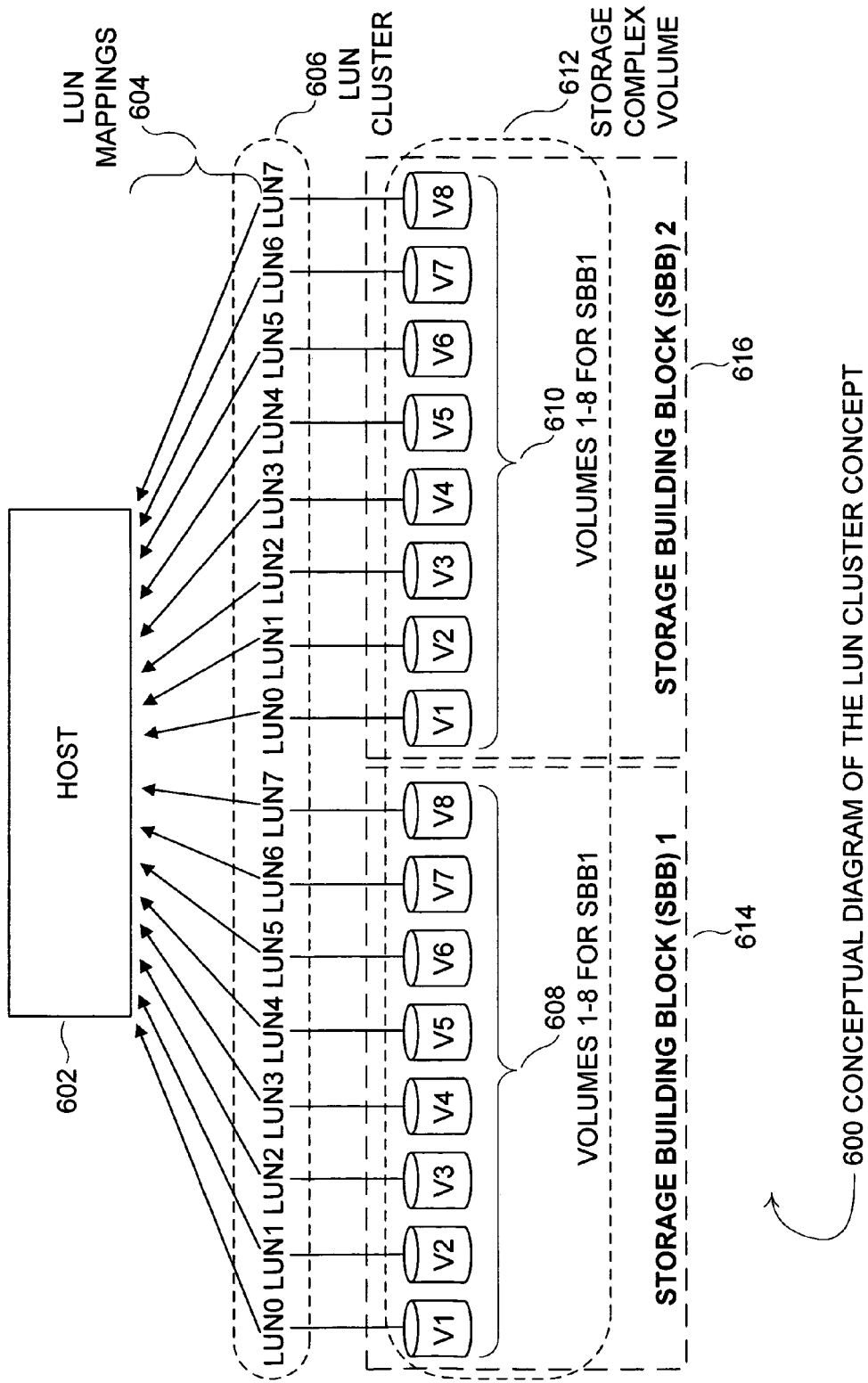
FIG. 6 is a schematic illustration of the concept of a Logical Unit Number (LUN) cluster.

FIG. 6 is a schematic illustration 600 of the concept of a Logical Unit Number (LUN) cluster. The LUN cluster (606) is another unique addressing mechanism of the SYMbol API for a storage complex. Typically there is a separate LUN for each individually addressable component of a SBB 614, 616. The LUN cluster number 606 permits addressing all objects within a single LUN cluster 606 with one number 606. In FIG. 6 RAID volumes 1-8 (608) of SBB 1 (614) have LUN 0-7 respectively. Similarly, RAID volumes 1-8 (610) of SBB 2 (616) have LUN 0-7 respectively. The LUN cluster 606 permits addressing RAID volumes 1 to 8 (608, 610) of both SBB 1 (614) and SBB 2 (616) using a single LUN cluster number 606. The LUN and LUN cluster are mapped 604 into the addressing scheme of the host computer system 602.

FIG. 7 is a table 700 of the relationship between LUN cluster numbers 702 and LUN numbers 704. The number of LUN numbers 704 per LUN cluster 702 is equal to the number of RAID volumes per SBB. For a system with eight RAID volumes per SBB, the first eight LUN numbers 708 of each SBB are associated with LUN cluster 0 (706). The next eight LUN numbers 712 of each SBB are associated with LUN cluster 1 (710). The progression continues until the maximum number of LUN clusters is reached. The maximum number of LUN clusters is a function of the number m of RAID volumes per SBB. The maximum number of LUN clusters is equal to (256/m)−1. For example, if m is eight, then the maximum number of LUN clusters is 31. The reason for subtracting one from the number is to leave a LUN cluster number available for the Universal Transport Mechanism (UTM) LUN used with the SYMbol API.

Figure 8:
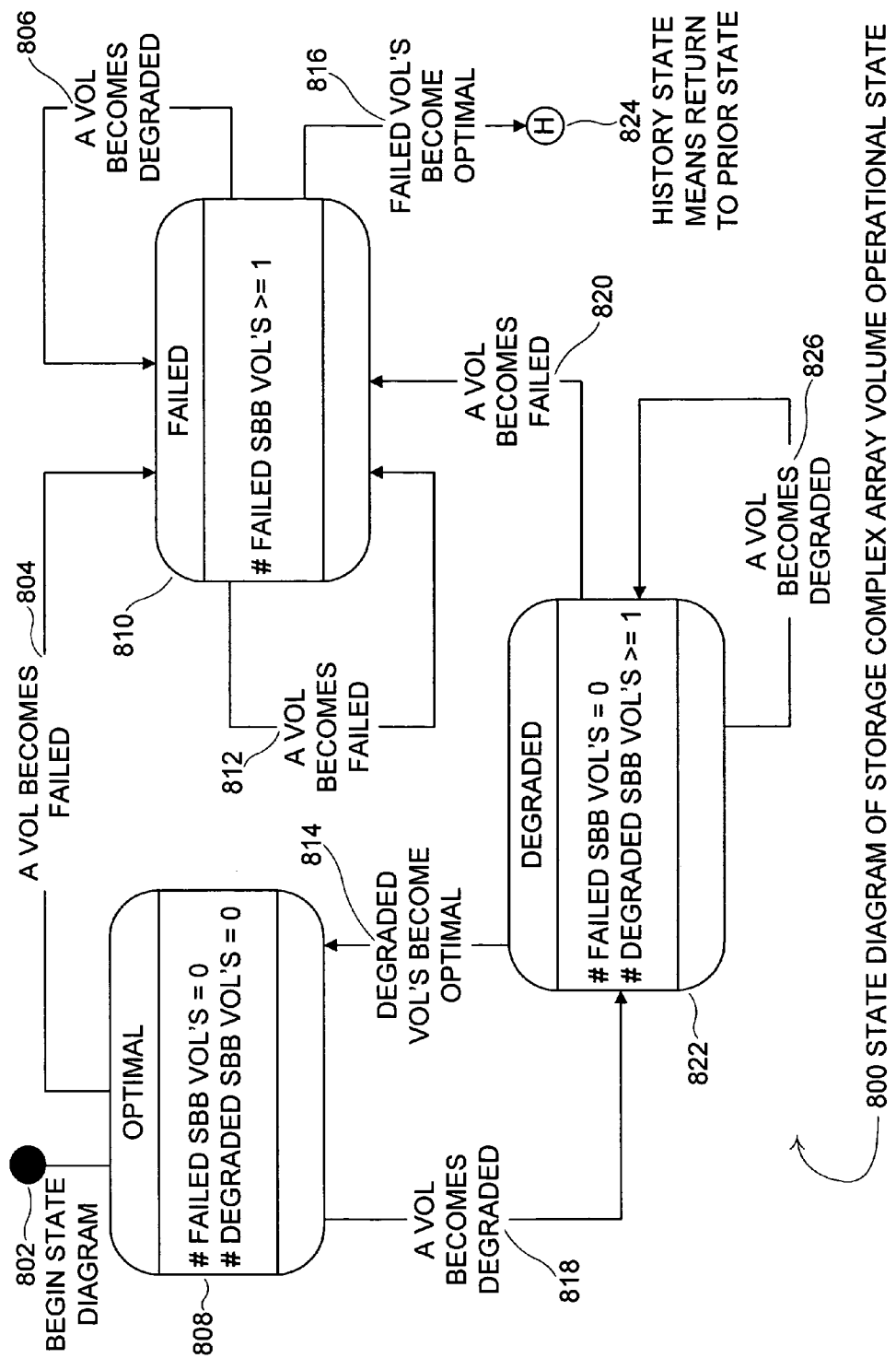
FIG. 8 is a state diagram of the possible operational states for a storage complex array volume.

FIG. 8 is a state diagram of the possible operational states 800 for a storage complex array volume. At the beginning 802 the state initially moves to the optimal state 808. The state of the storage complex volume as a whole is dependent on the individual state of each SBB RAID volume contained in the storage complex array volume. As long as any SBB RAID volumes do not fail or become degraded, then the state of the storage complex array volume stays optimal 808. If a SBB RAID volume fails 804, the state of the storage complex array volume becomes failed 810. As long as the number of failed SBB RAID volumes is greater than or equal to one, the state of the storage complex array volume remains failed 810. If additional SBB RAID volumes fail 812, the state of the storage complex array remains failed 810. If an SBB RAID volume becomes degraded 806 while other SBB RAID volumes are failed 810, the state of the storage complex array volume remains failed 810. If the failed SBB RAID volumes become optimal 816, the state of the system is returned to the historical state 824 that represents the prior degraded or optimal states of the SBB RAID volumes. If the system is returned to an optimal state 808 and a SBB RAID volume becomes degraded 818, then the state of the storage complex array volume becomes degraded 822. In the degraded state 822 there are not any SBB RAID volumes that have a failed state and there are one or more SBB RAID volumes that have a degraded state. If additional SBB RAID volumes become degraded 826, the state of the storage complex volume remains degraded 822. If a SBB RAID volume fails 820, the storage complex volume state changes from degraded 822 to failed 810 and follows the logic associated with the failed state 810 discussed previously. If there is not a failed SBB RAID volume and all degraded SBB RAID volumes become optimal 814, the state of the storage complex volume is returned to optimal 808.

Various embodiments therefore provide the ability to create a high end storage system by providing a host based software aggregation engine that permits a user to avoid the cost of specialized hardware. The aggregation engine further permits the system to be scalable by adding or removing mid-range storage arrays. The aggregation engine will typically be integrated with a volume manager application of an operating system to provide greater functionality than the volume manager or aggregation engine provide alone. The array management application provides a familiar graphical user interface for the aggregation engine. The array management application may be run remotely, thus, permitting a host to operate the aggregation engine without the burden of handling the graphics and user interaction associated with a graphical user interface.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for creating a large-scale storage array comprising the steps of:

creating a plurality of RAID storage volumes, each RAID storage volume of said plurality of RAID storage volumes being made up of a set of physical drives, said set of physical drives comprising at least one physical drive, each RAID storage volume of said plurality of RAID storage volumes having an equivalent number of physical drives in said set of physical drives, and each RAID storage volume of said plurality of RAID storage volumes having equivalent configuration and property settings including RAID level, volume segment size, and volume cache settings, but not including volume label;

sequentially numbering each physical drive of said set of physical drives with an individual drive number identifying each physical drive of said set of physical drives starting at a first drive number and sequentially numbering each drive of said set of physical drives until a last drive number is reached, each set of physical drives of each RAID storage volume of said set of RAID storage volumes being sequentially numbered with equivalent drive numbers as other sets of physical drives of other RAID storage volumes such that each set of physical drives of each RAID storage volume of said set of RAID storage volumes is sequentially numbered starting at said first drive number and ending at said last drive number;

dividing said plurality of RAID storage volumes into a plurality of storage building blocks with each storage building block of said plurality of storage building blocks comprising an equivalent number of RAID storage volumes, each storage building block of said plurality of storage building blocks being individually addressable as a mid-range storage array, and each storage building block of said plurality of storage building blocks having equivalent configuration and property settings including number of RAID storage volumes, but not including storage building block volume label;

combining said plurality of storage building blocks into a storage complex such that said storage complex combination of said plurality of storage building blocks is individually addressable as a single storage system;

creating a set of virtual drive clusters such that there is a virtual drive cluster corresponding to each physical drive contained in said set of physical drives and each virtual drive cluster of said set of virtual drive clusters contains each physical drive with an equivalent drive number for each set of physical drives of each RAID storage volume of each storage building block of said plurality of said storage building blocks of said storage complex;

physically connecting each storage building block of said plurality of storage building blocks that make up said storage complex to a host computer system; and managing said storage complex using aggregation engine software running on said host computer system such that said storage complex appears as said single storage system to applications running on said host computer system and other computer systems connected to said host computer system and such that said applications running on said host computer system and said other computer systems connected to said host computer system may perform storage management operations on each physical drive contained in a virtual drive cluster selected from said set of virtual drive clusters by performing said storage management operations one time on said selected virtual drive cluster.

2. The method for creating a large-scale storage array of claim 1 further comprising using an operating system volume manager application to handle communication path migration tasks while said aggregation engine software handles array management tasks.

3. The method for creating a large-scale storage array of claim 1 further comprising said host computer system accessing said storage building blocks and said RAID storage volume of said storage complex as said single storage system such that said single storage system is a virtual aggregation of said plurality storage building blocks.

4. The method for creating a large-scale storage array of claim 1 wherein said aggregation engine software is written in Java programming language and said aggregation engine software does not include graphical elements of said Java programming language in order to ensure timely completion of array management tasks by said aggregation engine software.

5. The method for creating a large-scale storage array of claim 1 wherein said aggregation engine software is written utilizing a software programming tool, said software programming tool being any of the group comprising: SYMbol application programming interface, storage management initiative specification, and any programming tool intended for assisting developers in creating storage system applications.

6. The method for creating a large-scale storage array of claim 1 further comprising providing system administrator access to said aggregation engine software from array management graphical user interface software, said array management graphical user interface software permitting said system administrator to configure and control said storage complex communication with said aggregation engine software.

7. The method for creating a large-scale storage array of claim 6 further comprising:
running said array management graphical user interface software on a second computer and not on said host computer system; and
communicating between said aggregation engine software and said array management graphical user interface software over a network connection between said second computer and said host computer system.

8. The method for creating a large-scale storage array of claim 1 further comprising:
creating a plurality of storage complexes using only said aggregation engine software running on said host computer system; and
communicating with said plurality of storage complexes in parallel such that said plurality of storage complexes requiring identical communications are sent said identical communication at the same time.

9. The method for creating a large-scale storage array of claim 1 further comprising:
sequentially numbering each RAID storage volume of a storage building block with a logical unit number (LUN) such that each RAID storage volume contained in each storage building block of said plurality of storage building blocks is sequentially numbered with equivalent LUN numbers;
creating a set of subgroups of LUN identifiers of RAID storage volumes for each storage building block of said plurality of storage building blocks such that said set of subgroups of LUN identifiers is equivalent for each storage building block of said plurality of storage building blocks;
creating a set of virtual LUN clusters such that there is a virtual LUN cluster corresponding to each subgroup of LUN identifiers of said set of subgroups of LUN identifiers such that each virtual LUN cluster of said set of virtual LUN clusters contains each subgroup of LUN identifiers with equivalent LUN identifiers for each set of subgroups of LUN identifiers of each storage building block of said plurality of storage building blocks of said storage complex; and
managing said storage complex using said aggregation engine software running on said host computer system such that said applications running on said host computer system and said other computer systems connected to said host computer system may further perform storage management operations on RAID storage volumes identified by LUN identifiers contained in a virtual LUN cluster selected from said set of virtual LUN clusters by performing said storage management operations one time on said selected virtual LUN cluster.

10. A large-scale storage array system comprising:
a plurality of RAID storage volumes, each RAID storage volume of said plurality of RAID storage volumes being made up of a set of physical drives, said set of physical drives comprising at least one physical drive, each RAID storage volume of said plurality of RAID storage volumes having an equivalent number of physical drives in said set of physical drives, each RAID storage volume of said plurality of RAID storage volumes having equivalent configuration and property settings including RAID level, volume segment size, and volume cache settings, but not including volume label, and each physical drive of said set of physical drives being sequentially numbered with an individual drive number identifying each physical drive of said set of physical drives starting at a first drive number and sequentially numbering each drive of said set of physical drives until a last drive number is reached, each set of physical drives of each RAID storage volume of said set of RAID storage volumes being sequentially numbered with equivalent drive numbers as other sets of physical drives of other RAID storage volumes such that each set of physical drives of each RAID storage volume of said set of RAID storage volumes is sequentially numbered starting at said first drive number and ending at said last drive number;

dividing said plurality of RAID storage volumes into a plurality of storage building blocks with each storage building block of said plurality of storage building blocks comprising an equivalent number of RAID storage volumes, each storage building block of said plurality of storage building blocks being individually addressable as a mid-range storage array, and each storage building block of said plurality of storage building blocks having equivalent configuration and property settings including number of RAID storage volumes, but not including storage building block volume label;

a plurality of storage building blocks, each storage building block of said plurality of storage building blocks being comprised of an equivalent number of RAID storage volumes divided from said plurality of RAID storage volumes, each storage building block of said plurality of storage building blocks being individually addressable as a mid-range storage array, and each storage building block of said plurality of storage building blocks having equivalent configuration and property settings including number of RAID storage volumes, but not including storage building block volume label;

a storage complex that is a combination of said plurality of storage building blocks and that is individually addressable as a single storage system;

a host computer system;

a physical connecting for each storage building block of said plurality of storage building blocks that make up said storage complex to said host computer system; and an aggregation engine software application running on said host computer system that creates a set of virtual drive clusters such that there is a virtual drive cluster corresponding to each physical drive contained in said set of physical drives and each virtual drive cluster of said set of virtual drive clusters contains each physical drive with an equivalent drive number for each set of physical drives of each RAID storage volume of each storage building block of said plurality of said storage building blocks of said storage complex, that manages said storage complex such that said storage complex appears as said single storage system to applications running on said host computer system and other computer systems connected to said host computer system, and that allows said applications running on said host computer system and said other computer systems connected to said host computer system to perform storage management operations on each physical drive contained in a virtual drive cluster selected from said set of virtual drive clusters by performing said storage management operations one time on said selected virtual drive cluster.

11. The large-scale storage array system of claim 10 further comprising an operating system volume manager application that handles communication path migration tasks while said aggregation engine software application handles array management tasks.

12. The large-scale storage array system of claim 10 further comprising a virtual volume subsystem that permits said host computer system to access said combination of said plurality of storage building blocks and said plurality of RAID storage volume of said storage complex as said single storage system such that said single storage system is a virtual aggregation of said combination of said plurality of storage building blocks.

13. The large-scale storage array system of claim 10 wherein said aggregation engine software application is written in Java programming language and said aggregation engine software application does not include graphical elements of said Java programming language in order to ensure timely completion of array management tasks by said aggregation engine software application.

14. The large-scale storage array system of claim 10 wherein said aggregation engine software application is written utilizing a software programming tool, said software programming tool being any of the group comprising: SYMbol application programming interface, storage management initiative specification, and any programming tool intended for assisting developers in creating storage system applications.

15. The large-scale storage array system of claim 10 further comprising an array management software application that permits a system administrator to configure and control said storage complex, said array management software application being a graphical user interface into said aggregation engine software application.

16. The large-scale storage array system of claim 15 wherein said array management software application is running on a second computer system and not on said host computer system, and said array management software application communicates with said aggregation engine software application over a network connection between said second computer and said host computer system.

17. The large-scale storage array system of claim 10 wherein said aggregation engine software application further comprises:

a multitasking subsystem that permits said aggregation engine software application to manage a plurality of storage complexes; and a parallel communicating subsystem that permits said aggregation engine software application to send identical communications at the same time to said plurality of storage complexes when said multiple storage complexes require said identical communications.

18. The large-scale storage array system of claim 10:

wherein each RAID storage volume of each storage building block of said plurality of storage building blocks is sequentially numbered with a logical unit number (LUN) such that each RAID storage volume contained in each storage building block of said plurality of storage building blocks is sequentially numbered with equivalent LUN numbers; and wherein said aggregation engine software application further:

creates a set of subgroups of LUN identifiers of RAID storage volumes for each storage building block of said plurality of storage building blocks such that said set of subgroups of LUN identifiers is equivalent for each storage building block of said plurality of storage building blocks;

creates a set of virtual LUN clusters such that there is a virtual LUN cluster corresponding to each subgroup of LUN identifiers of said set of subgroups of LUN identifiers such that each virtual LUN cluster of said set of virtual LUN clusters contains each subgroup of LUN identifiers with equivalent LUN identifiers for each set of subgroups of LUN identifiers of each storage building block of said plurality of storage building blocks of said storage complex; and manages said storage complex using said aggregation engine software running on said host computer system such that said applications running on said host computer system and said other computer systems connected to said host computer system may further perform storage management operations on RAID storage volumes identified by LUN identifiers contained in a virtual LUN cluster selected from said set of virtual LUN clusters by performing said storage management operations one time on said selected virtual LUN cluster.

19. A large-scale storage array system comprising:

means for creating a plurality of RAID storage volumes, each RAID storage volume of said plurality of RAID storage volumes being made up of a set of physical drives, said set of physical drives comprising at least one physical drive;

means for sequentially numbering each physical drive of said set of physical drives with an individual drive number identifying each physical drive of said set of physical drives starting at a first drive number and sequentially numbering each drive of said set of physical drives until a last drive number is reached, each set of physical drives of each RAID storage volume of said set of RAID storage volumes being sequentially numbered with equivalent drive numbers such that each set of physical drives of each RAID storage volume of said set of RAID storage volumes is sequentially numbered starting at said first drive number and ending at said last drive number;

means for dividing said plurality of RAID storage volumes into a plurality of storage building blocks with each storage building block of said plurality of storage building blocks comprising an equivalent number of RAID storage volumes and each storage building block of said plurality of storage building blocks being individually addressable as a mid-range storage array;

means for combining said plurality of storage building blocks into a storage complex; such that said storage complex combination of said plurality of storage building blocks is individually addressable as a single storage system;

means for creating a set of virtual drive clusters such that there is a virtual drive cluster corresponding to each physical drive contained in said set of physical drives;

means for physically connecting each storage building block of said plurality of storage building blocks that make up said storage complex to a host computer system; and means for managing said storage complex using aggregation engine software running on said host computer system such that said storage complex appears as said single storage system to applications running on said host computer system and other computer systems connected to said host computer system and such that said applications running on said host computer system and said other computer systems connected to said host computer system may perform storage management operations on each physical drive contained in a virtual drive cluster selected from said set of virtual drive clusters by performing said storage management operations one time on said selected virtual drive cluster.

20. The large-scale storage array system of claim 19 further comprising:

means for sequentially numbering each RAID storage volume of a storage building block with a logical unit number (LUN);

means for creating a set of subgroups of LUN identifiers of RAID storage volumes for each storage building block of said plurality of storage building blocks;

means for creating a set of virtual LUN clusters such that there is a virtual LUN cluster corresponding to each subgroup of LUN identifiers of said set of subgroups of LUN identifiers; and means for managing said storage complex using said aggregation engine software running on said host computer system such that said applications running on said host computer system and said other computer systems connected to said host computer system may further perform storage management operations on RAID storage volumes identified by LUN identifiers contained in a virtual LUN cluster selected from said set of virtual LUN clusters by performing said storage management operations one time on said selected virtual LUN cluster.

* * * * *